Figure 1:
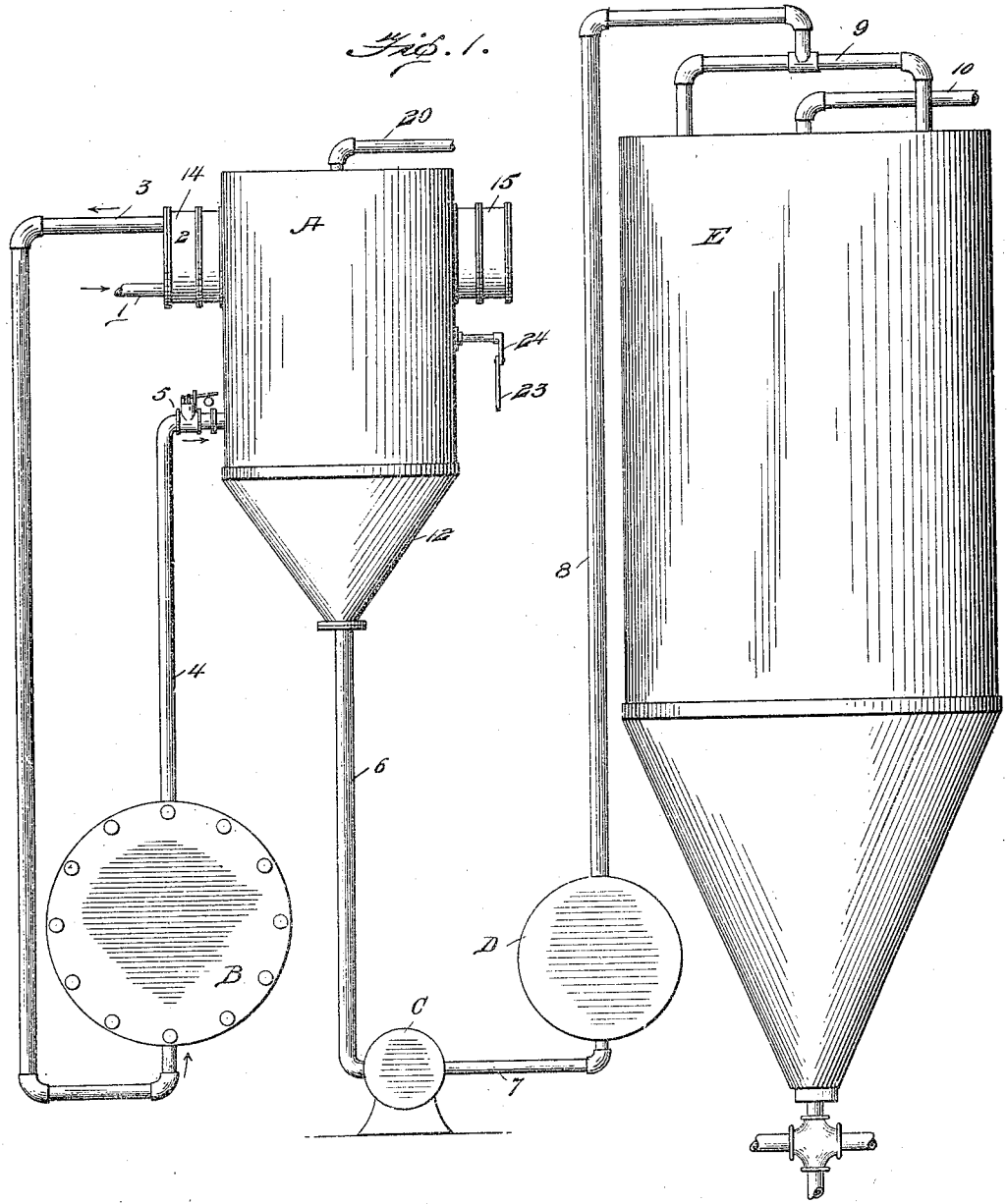

E. W. DEMING.
PROCESS AND APPARATUS FOR TREATING LIQUIDS.
APPLICATION FILED APR. 13, 1908.

1,052,220.

Patented Feb. 4, 1913.

3 SHEETS—SHEET 3.

WITNESSES:

INVENTOR,
Eugene W. Deming.
BY
Byrnes, Townsend & Buckenstein
ATTORNEYS

UNITED STATES PATENT OFFICE.

EUGENE W. DEMING, OF NEW YORK, N. Y., ASSIGNOR TO DEMING APPARATUS COMPANY, OF NEW YORK, N. Y., A CORPORATION OF NEW YORK.

PROCESS AND APPARATUS FOR TREATING LIQUIDS.

1,052,220.

Specification of Letters Patent.

Patented Feb. 4, 1913.

Application filed April 13, 1908. Serial No. 426,900.

*To all whom it may concern:*

Be it known that I, EUGENE W. DEMING, a citizen of the United States, residing at Winslow Court, One Hundred and Forty-first street and Hamilton Place, New York city, in the county of New York and State of New York, have invented certain new and useful Improvements in Processes and Apparatus for Treating Liquids, of which the following is a specification.

The object of this invention is the provision of a novel process of treating liquids preparatory to separating suspended solids therefrom.

The invention is particularly applicable to the treatment or defecation of sugar solutions or the like and will be described by reference to this application, it being understood that the invention is capable of use in other relations.

It is well understood that in the clarification or purification of sugar cane juices much difficulty is experienced in the separation of solid matters, principally the fibers of the cane and the precipitate resulting from the action of heat and of the reagents, such as sulfur dioxid and lime, used for clarification. According to modern practice the cane juices from the crushing rolls, after passing through a strainer for the separation of coarse fiber, are treated with sulfur dioxid and lime or other suitable reagents and are thereafter heated to or above their atmospheric boiling point while flowing under appropriate pressure through a system of heating tubes. The solids are then separated by settling or filtration or by a combination of these methods. Preferably the highly heated juices containing the suspended solids pass, either before or after cooling to or below the atmospheric boiling point, to a continuous-flow separating device, usually a tank from which the clear portions of the juice overflow while the separated solids are continuously withdrawn to filter presses or the like.

The specific gravity of the solids is but slightly greater than that of the juices and the separation by gravity is therefore difficult and usually incomplete under any system involving continuous flow. The juices from the crushing rolls contain and persistently retain a large proportion of dissolved and mechanically held air, and in the aftertreatment of the juices other gases are produced. When the juices are heated under pressure in a closed system no opportunity is afforded for the escape of these gases, and in case the juices are conducted directly, or after cooling, to a device for separating the solids, the gases liberated within the body of liquid interfere seriously with the separating operation, retarding or preventing the downward movement of the suspended particles and even conveying a considerable proportion of these to the surface. These gases also interfere seriously with the operation of the filter presses, reducing their capacity.

I have now discovered that the continuous separation of the solids is rendered relatively easy of accomplishment by the provision between the heating and separating devices of means for eliminating all or substantially all of the contained gases.

One form of apparatus embodying my invention is illustrated in the accompanying drawings wherein—

Figure 2:
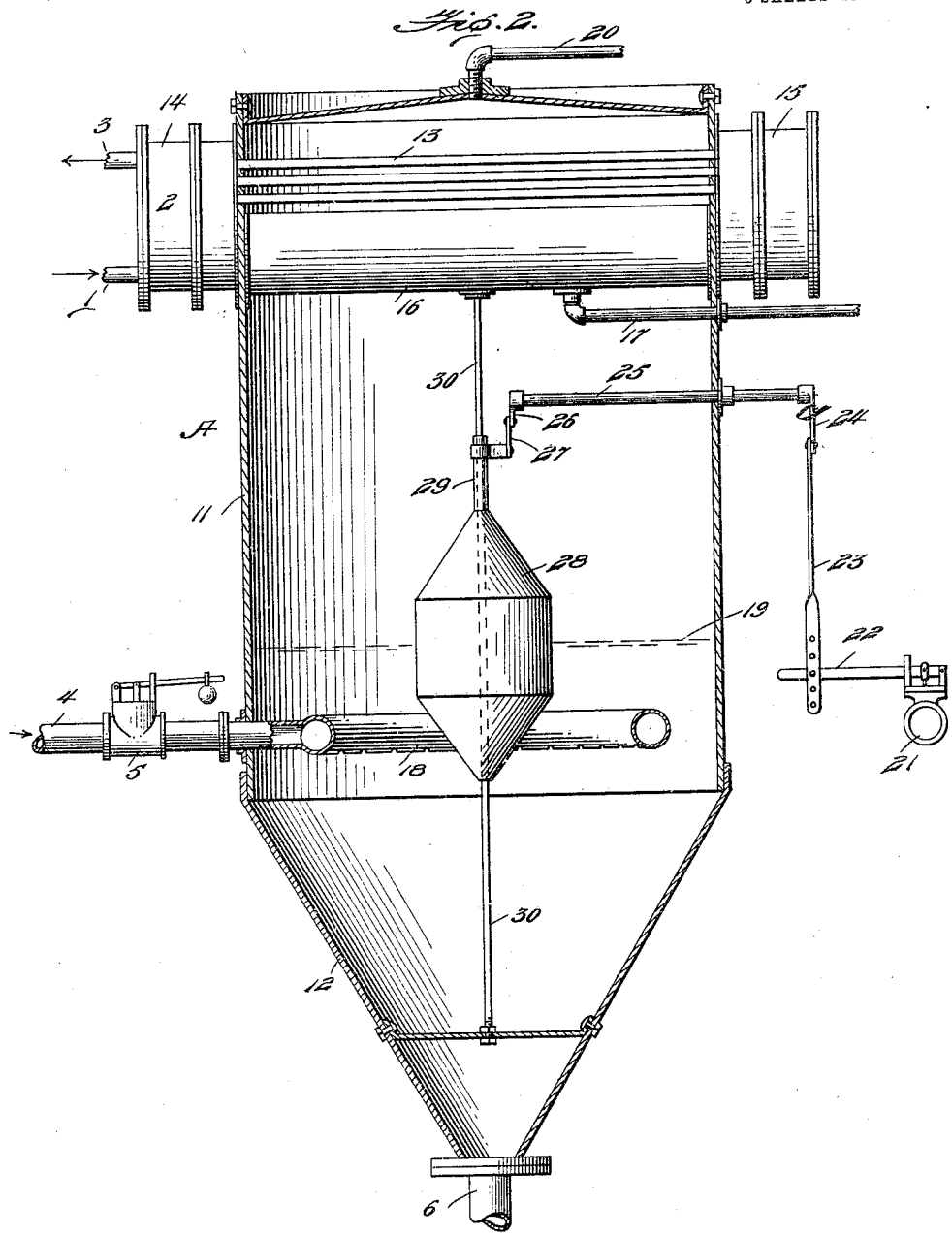

Figure 1 is a diagrammatic elevation showing an apparatus for treating sugar cane juices, this apparatus comprising a heater or digester for the raw juice, a gas eliminator, a reheater for the degasified juice and a continuous-flow separating tank; Fig. 2 is a vertical axial section on an enlarged scale of the gas eliminator, and Fig. 3 is an axial section of the eliminator in a plane at right angles to that of Fig. 2.

The eliminator A as illustrated in Fig. 1 is arranged to receive the juice from the crushing rolls, after treatment with sulfur dioxid and lime or other appropriate reagents, through a supply pipe 1 leading to a surface condenser 2 in the upper part of the eliminator. A discharge pipe 3 leads from this condenser to a heater or digester B by which the solution is brought to a suitable temperature which may equal or exceed the atmospheric boiling point. From this heater the juice passes through a pipe 4 and adjustably-weighted pressure-reducing valve 5 into the eliminator A, which in the form shown comprises a closed tank having cylindrical sides and converging bottom. A pipe 6 leads from the bottom of the eliminator to a circulating pump C which delivers the degasified juice through pipes 7, 8, 9 to a continuous-flow separating tank E, which may be of the character described in my prior Patent 885,450 granted April 21, 1908, or of any other suitable type. From this separator the purified juice passes through pipe 10 to the evaporators.

D represents a reheater for use in case it is desired to raise the temperature of the degasified juice before separating the solids therefrom. The heater B, pump C and reheater D may be of any conventional and well known construction.

Figure 3:
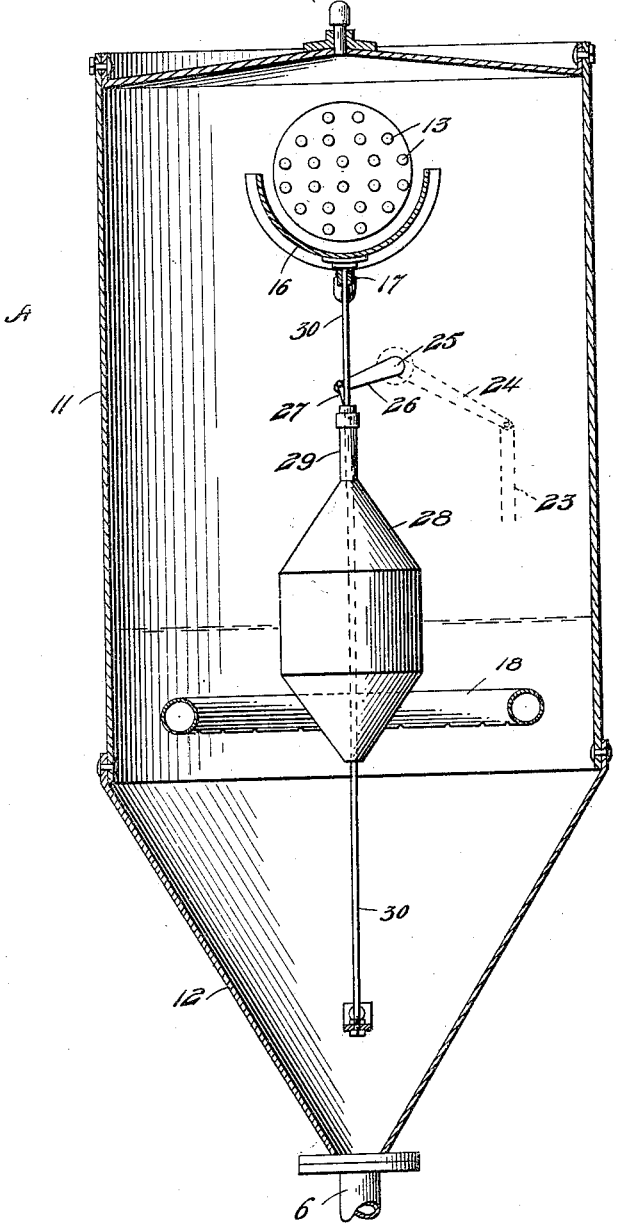

The eliminator A, shown in detail in Figs. 2 and 3, comprises a cylindrical tank 11, preferably of sheet-steel, having a 60° conical bottom 12 leading to the discharge pipe 6. A surface-condenser and juice-preheater 2 is arranged in the upper part of the tank, and comprises a number of horizontal pipes 13, usually of copper, extending transversely across the space in the upper part of the tank and connected to cast-iron heads 14, 15 outside the tank, the juice received through pipe 1 traveling back and forth through the pipes 13 and finally out through pipe 3. Beneath the pipes 13 and riveted to the sides of the tank or otherwise supported therein is a trough or pan 16 which receives the condensate produced by contact of the hot vapors with the relatively cold outer surfaces of the pipes 13. A pipe 17 leads from the bottom of the pan 16 for the discharge of this condensate.

The juice containing suspended solids, preheated in its passage through the pipes 13, is raised to the proper temperature in the heater B and, passing the pressure-reducing valve 5, is delivered into a horizontal annular tube 18 of copper, having a perforated lower wall, within the tank 11 and just above its conical bottom. The hot juice delivered through the perforations accumulates in the tank to a level indicated by the line 19, the air and other gases escaping freely from its upper surface, and the liquid then passing out through the pipe 6 below. A pipe 20 leads from the head at the top of the closed tank to a vacuum pump, not shown, and this pump coöperates with the surface condenser 13 to produce a partial vacuum in the upper part of the tank, the air and other gases readily escaping from the surface of the hot liquid below into the partially-exhausted space above.

The steam pump C, serving to withdraw the degasified liquid from the eliminator and deliver it to the separator E, has a steam supply valve 21 which is controlled by a lever 22, and this lever is actuated, through a link 23, crank 24, rock-shaft 25, crank 26 and link 27, or other suitable mechanism, by a vertically-movable float 28, partially submerged in the liquid in the tank.

This float has a central guide-tube 29 sliding on a vertical fixed rod 30. The float so controls the supply of steam to the pump C as to maintain the surface 19 of the liquid at a substantially constant level.

In operating the apparatus for the treatment of cane juices these are preferably although not necessarily heated in the digester B to a temperature somewhat exceeding the atmospheric boiling point, an appropriate pressure being maintained by the valve 5. If juices so heated were permitted to escape into an open vessel their temperature would at once fall to the atmospheric boiling point, a proportion of water corresponding to the change of temperature being instantly vaporized. In case the juices heated to a temperature either above or below the atmospheric boiling point are permitted to flow into a vessel wherein a diminished pressure is maintained, their temperature will fall to a point corresponding to the boiling point under such diminished pressure, vapor being formed as above. The effect of the gas-eliminator herein described, when operated in connection with a heater for the raw juice, is to condense these vapors by transferring heat therefrom to the juice flowing to the heater or digester, thereby conserving this heat; at the same time the gases carried by the heated juice are removed with substantial completeness, and the subsequent separation of the solids is facilitated as above pointed out. Obviously also there occurs a concentration of the juices corresponding to the amount of condensate removed through pipe 17. It will be apparent that by a proper adjustment between the temperature of the juice passing from the digester B and the pressure within the eliminator A, such adjustment being at all times within the control of the operator, any desired proportion of the heat from the juices entering the tank 11 may be transferred to the incoming juice flowing through the pipes 13, at the same time that the heated juices are degasified. It is further apparent that the eliminator may be operated at normal pressures or at pressures either above or below normal in accordance with the requirements of any particular case, the fixed gases being removed through the pipe 20 and the vapors of water or any desired proportion of these being condensed by controlling the flow of juice through the surface condenser. In practice the degasified juices, under proper conditions and at suitable temperatures, are found to settle quickly and completely as compared with juices from which the gases have not been removed, and the apparatus is found to operate with a high degree of heat-economy. The separation of solids occurs in the separator E without contact of air and with a minimum quantity of liquid in transit and subject to deterioration from inversion, fermentation and other causes.

In the drawings I have indicated such relation between the float 28 and the liquid inlet 18 to the eliminator A that the liquid is introduced beneath the normal liquid level in the eliminator. The position of the float is however readily adjusted, and its position may be altered as required to meet particular conditions: thus when the juice exhibits a strong tendency to foam in the eliminator the liquid level therein may be carried below the inlet 18, the latter being raised if necessary, in order that the foam may be beaten down by the inflowing streams of liquid. Should the liquid flowing from the pipe 17 contain appreciable proportions of sugar it may be used for saturation at the milling plant or otherwise treated to avoid loss.

I claim:

1. The continuous process of separating suspended solids from liquids, which consists in heating the liquid under pressure, then reducing the pressure to separate therefrom the dissolved or mechanically retained gases, and finally separating the solids by gravity from a flowing column of the gas-free liquid.

2. The continuous process of separating suspended solids from liquids, which consists in heating the liquid under pressure, then reducing the pressure to convert a portion of the liquid into steam and to separate from the residual liquid the dissolved or mechanically retained gases, effecting a heat-interchange between the steam and the liquid passing to the heater, and finally separating the solids by gravity from a flowing column of the gas-free liquid.

3. The continuous process of separating suspended solids from liquids, which consists in heating the liquid under pressure, then reducing the pressure to a degree below that of the atmosphere to convert a portion of the liquid into steam and to separate from the residual liquid the dissolved or mechanically retained gases, effecting a heat-interchange between the steam and the liquid passing to the heater, and finally separating the solids by gravity from a flowing column of the gas-free liquid.

4. Apparatus for treating liquids carrying solids in suspension, comprising in combination a liquid-heater, a continuous-flow separating tank for suspended solids, a closed gas-eliminator, pipe connections between said gas-eliminator and said liquid-heater and separating tank, and a surface condenser located in the vapor space of the gas-eliminator.

5. Apparatus for treating liquids carrying solids in suspension, comprising in combination a liquid-heater, a continuous-flow separating tank for suspended solids, a closed gas-eliminator having a surface condenser located in its vapor space, pipe connections between said gas-eliminator and said liquid-heater and separating tank, and a pipe connection between said surface condenser and said liquid-heater.

6. In apparatus for treating liquids carrying solids in suspension, a gas-eliminator comprising a closed tank having a liquid-inlet and outlet and an outlet for fixed gases, means for maintaining a constant liquid level within said tank, and a surface condenser in operative connection with said tank.

7. In apparatus for treating liquids carrying solids in suspension, a gas-eliminator comprising a closed tank having a liquid inlet and outlet and an outlet for fixed gases, a distributer for the inflowing liquid, and a surface condenser comprising tubes disposed in the upper portion of said tank.

8. In apparatus for treating liquids carrying solids in suspension, a gas-eliminator comprising a closed tank having a liquid inlet and outlet and an outlet for fixed gases. means for maintaining a constant liquid level within said tank, a surface condenser comprising tubes disposed in the upper portion of said tank, and means for collecting the condensate and conveying it from said tank.

9. The process of defecating sugar juices which comprises heating said juices under pressure to produce defecation, degasifying under a less pressure and again raising the pressure to permit settling.

10. The process of defecating sugar juices which comprises heating said juices under pressure to produce defecation, degasifying under a partial vacuum and again raising the pressure to permit settling.

11. The process of defecating sugar juices which comprises heating said juices under pressure to produce defecation, degasifying under a partial vacuum and settling under atmospheric pressure.

12. The process of defecating sugar juices which comprises heating said juices under pressure to produce defecation, exposing the hot juices to a less pressure to permit evolution of gas and vapors while condensing said vapors to aid in the maintenance of such less pressure and settling under a higher pressure.

13. The process of defecating sugar juices which comprises heating said juices under pressure to produce defecation, exposing the hot juices to a partial vacuum to permit evolution of gas and vapors while condensing said vapors to aid in the maintenance of such vacuum, and settling under atmospheric pressure.

14. The process of defecating sugar juices which comprises heating said juices under pressure to produce defecation, exposing the hot juices to a partial vacuum to permit evolution of gas and vapors while condensing said vapors by juice in transit to the heating operation whereby aid in the maintenance of the vacuum is afforded and heat is recovered, and settling under atmospheric pressure.

15. The process of defecating sugar juices which comprises heating said juices under pressure to produce defecation, exposing the hot juices to a vacuum to permit evolution of gas and vapors and contacting the produced vapors with a juice-cooled heat-interchanging wall to condense the same and aid in maintenance of vacuum and settling under atmospheric pressure.

16. The continuous process of treating liquids carrying solids in suspension, which consists in heating the liquid under pressure to produce separated solids, then separating dissolved or mechanically held gases by a reduction of pressure and finally separating the solids from the gas-free liquid by gravity at a higher pressure than that prevailing in the gas separating stages.

17. The continuous process of treating liquids carrying solids in suspension, which consists in heating the liquid under pressure to produce separated solids, reducing the pressure and thereby separating dissolved or mechanically held gases, and finally separating the solids from the gas-free liquid by gravity under a greater pressure.

18. The continuous process of treating liquids carrying solids in suspension, which consists in heating the liquid under pressure to produce separated solids, reducing the pressure and thereby separating dissolved or mechanically held gases and vaporizing water, transferring heat from the said gas and vapor to the liquid to be treated, and finally separating the solids from the gas-free liquid under a greater pressure.

19. The continuous process of treating liquids carrying solids in suspension, which consists in heating the liquid under pressure to produce separated solids, reducing the pressure and thereby separating dissolved or mechanically held gases and vaporizing water, transferring heat from said gas and vapor to the liquid to be treated, and finally separating the solids from the gas-free liquid by gravity under a greater pressure.

20. In a defecating apparatus, the combination of means for heating juice under plus pressure, means for settling the heated juice and intermediate means for exposing the juice to less pressure than prevails in the settling means, all said means being pipe connected and operating on the juice in continuous transit.

21. In a defecating apparatus, the combination of pipe connected means for heating juice under plus pressure, means for exposing the heated juice to a less pressure and means for again raising the pressure and permitting settling of solids.

22. In a defecating apparatus, the combination of pipe connected means for heating juice under plus pressure, means for exposing the hot juice to a vacuum, means for settling the juice at ordinary pressure and pipe connections between said means.

23. A defecating apparatus comprising a superheater for juice, a source of supply of juice under pressure therefor, a vacuum chamber receiving juice from the superheater, a condenser receiving vapors from said chamber and fed with cooling juice from said source, and settling means receiving juice from said chamber and pipe connections thereto.

24. A defecating apparatus comprising a juice superheater, a vacuum chamber and a settling chamber pipe connected in series and treating juice successively in continuous transit, and a preliminary heater delivering juice to said superheater and receiving vapors from said vacuum chamber.

25. A defecating apparatus comprising a juice preheater, a juice superheater, a vacuum chamber and a settling chamber pipe connected in series and treating juice successively in continuous transit and means for heating the juice in the preliminary heater by vapors from the vacuum chamber.

In testimony whereof, I affix my signature in presence of two witnesses.

EUGENE W. DEMING.

Witnesses:
K. V. RICHARD,
EDWD. KEENA.